(12) United States Patent
Mayville

(10) Patent No.: US 11,233,349 B2
(45) Date of Patent: Jan. 25, 2022

(54) QUICK CONNECTOR WITH SPHERICAL INTERFACE

(71) Applicant: Kuster North America, Inc., Troy, MI (US)

(72) Inventor: Brian Andrew Mayville, Northville, MI (US)

(73) Assignee: Kuster North America, Inc., Troy, MI (US)

( * ) Notice: Subject to any disclaimer, the term of this patent is extended or adjusted under 35 U.S.C. 154(b) by 59 days.

(21) Appl. No.: 16/902,778

(22) Filed: Jun. 16, 2020

(65) Prior Publication Data

US 2021/0005998 A1    Jan. 7, 2021

Related U.S. Application Data

(60) Provisional application No. 62/869,737, filed on Jul. 2, 2019.

(51) Int. Cl.
| | |
|---|---|
| *H01R 13/187* | (2006.01) |
| *H01R 13/627* | (2006.01) |
| *H01R 13/28* | (2006.01) |
| *H01R 13/635* | (2006.01) |

(52) U.S. Cl.
CPC .......... *H01R 13/187* (2013.01); *H01R 13/28* (2013.01); *H01R 13/6273* (2013.01); *H01R 13/635* (2013.01)

(58) Field of Classification Search
CPC .. H01R 13/15; H01R 13/187; H01R 13/6273; H01R 13/28; H01R 13/635

USPC ................. 439/786, 816, 819, 820
See application file for complete search history.

(56) References Cited

U.S. PATENT DOCUMENTS

| | | | | |
|---|---|---|---|---|
| 2,128,112 A | * | 8/1938 | Barlow | H01R 4/52 |
| | | | | 403/19 |
| 2,448,548 A | | 9/1948 | Purdy | |
| 3,136,844 A | * | 6/1964 | Petersen | H01R 9/0503 |
| | | | | 174/90 |
| 4,362,352 A | * | 12/1982 | Hawkins | H01R 4/52 |
| | | | | 174/90 |
| 4,403,885 A | | 9/1983 | Babb | |
| 4,501,404 A | | 2/1985 | Nelson | |
| 4,645,373 A | | 2/1987 | Purdy | |
| 4,733,625 A | | 3/1988 | Allen | |
| 6,146,049 A | | 11/2000 | Faris | |
| 7,637,686 B2 | | 12/2009 | Wood et al. | |
| 7,927,036 B2 | | 4/2011 | Reasoner | |
| 8,616,524 B2 | | 12/2013 | Tiberghien et al. | |

(Continued)

*Primary Examiner* — Gary F Paumen
(74) *Attorney, Agent, or Firm* — Dinsmore & Shohl LLP

(57) ABSTRACT

A quick connect assembly having a male terminal with a plurality of circumferentially arrayed and elongated beams including forward-most arcuate projecting and outer diameter defining portions. A female terminal has a housing exhibiting an inner diameter inlet communicating with an interior arcuate and expanded extending recess which matches a profile defined by the outer diameter beam portions. A forwardly spring biased plug is displaceably supported within the female terminal housing and includes a forward most projecting snout portion which, upon installation of the male to female terminals, the projecting snout portion of the plug seats between the male beams, preventing unintended collapse and remove of the male beams from within the female housing.

20 Claims, 4 Drawing Sheets

(56) References Cited

U.S. PATENT DOCUMENTS

| | | |
|---|---|---|
| 9,080,599 B2 | 7/2015 | Rutkowski et al. |
| 9,121,439 B2 | 9/2015 | Schimings et al. |
| 9,222,501 B2 | 12/2015 | Argillier et al. |
| 9,534,720 B2 | 1/2017 | Reasoner |
| 9,782,909 B2 | 10/2017 | Kehoe et al. |
| 10,156,252 B2 | 12/2018 | Dunkin et al. |
| 2005/0196231 A1 | 9/2005 | McKay et al. |

* cited by examiner

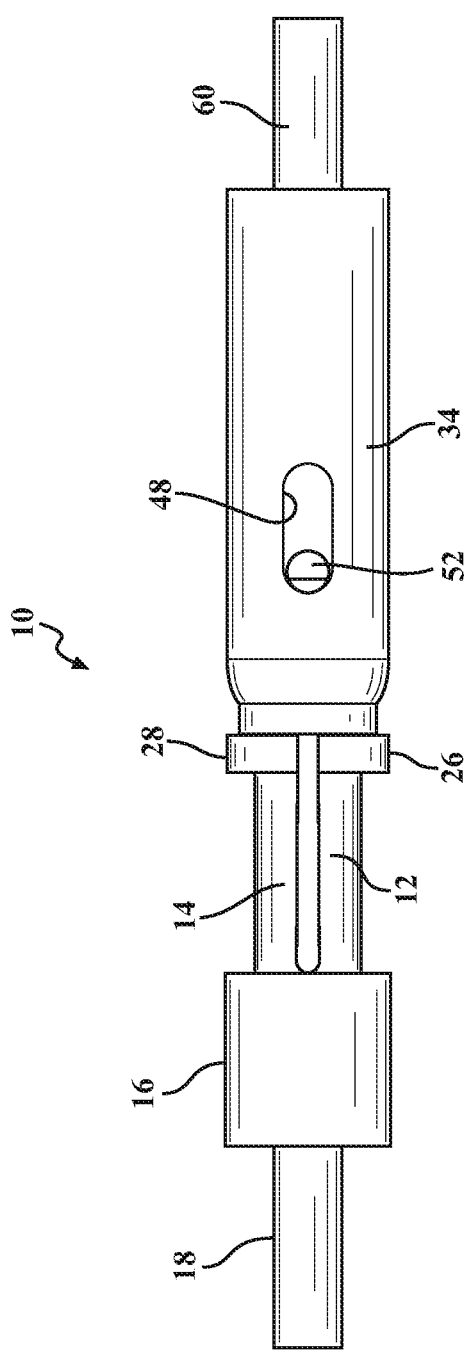
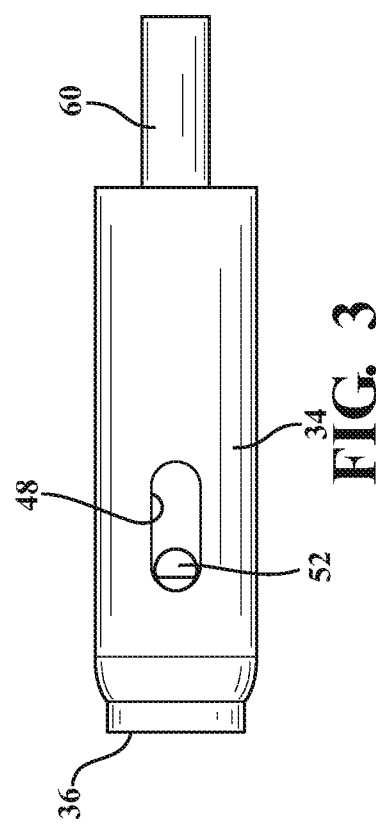
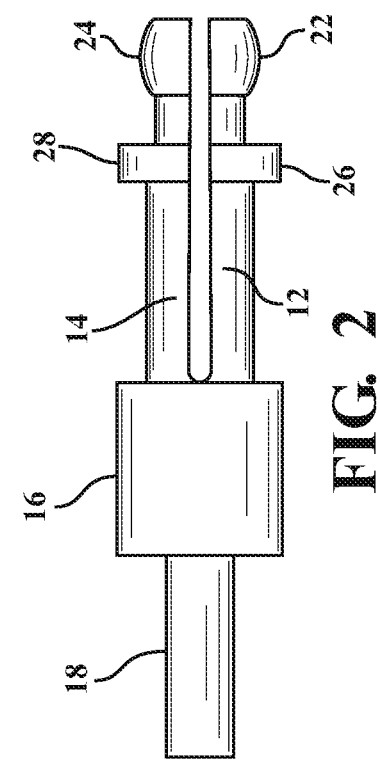

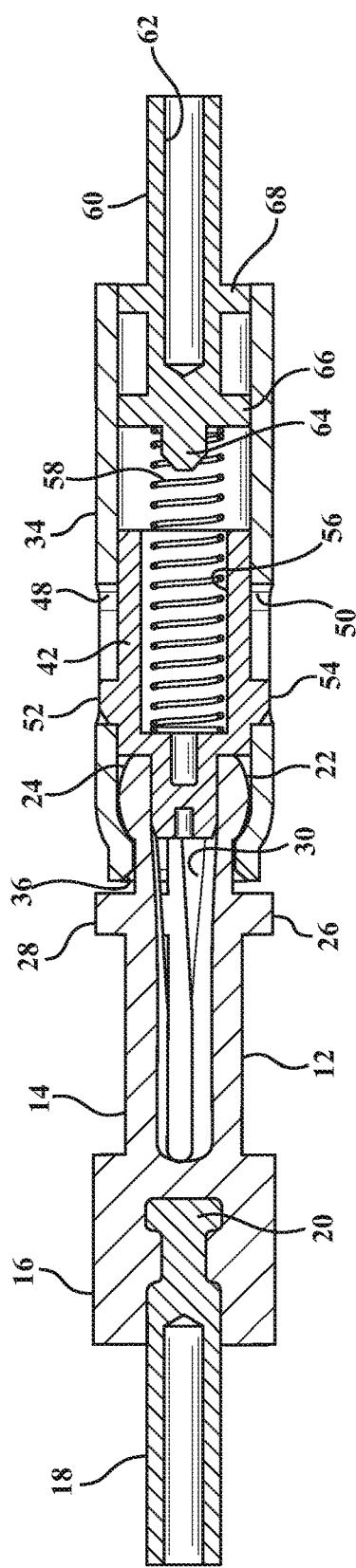
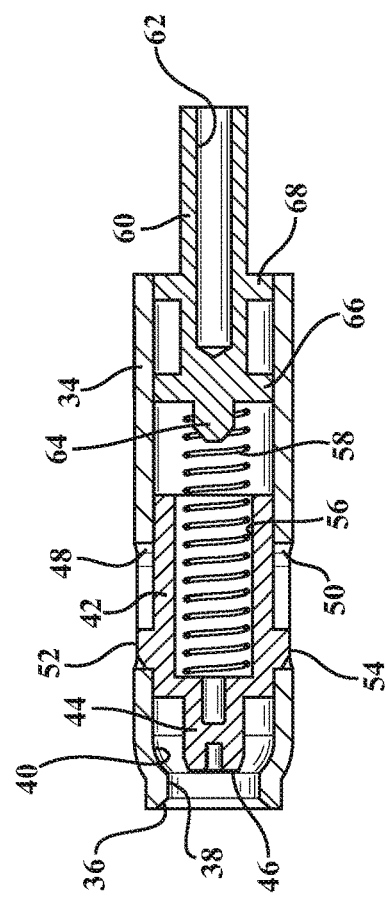
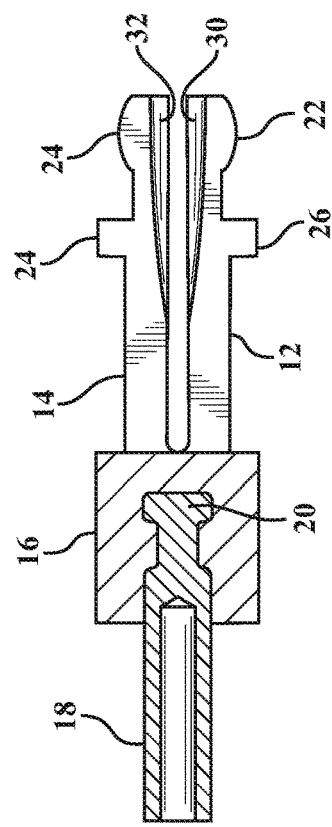
FIG. 4
FIG. 5
FIG. 6

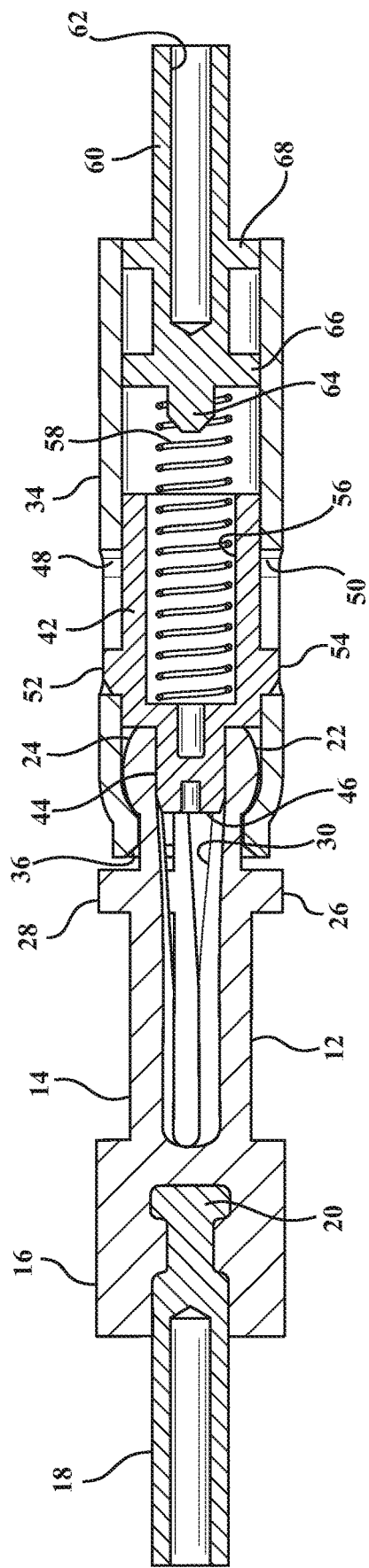
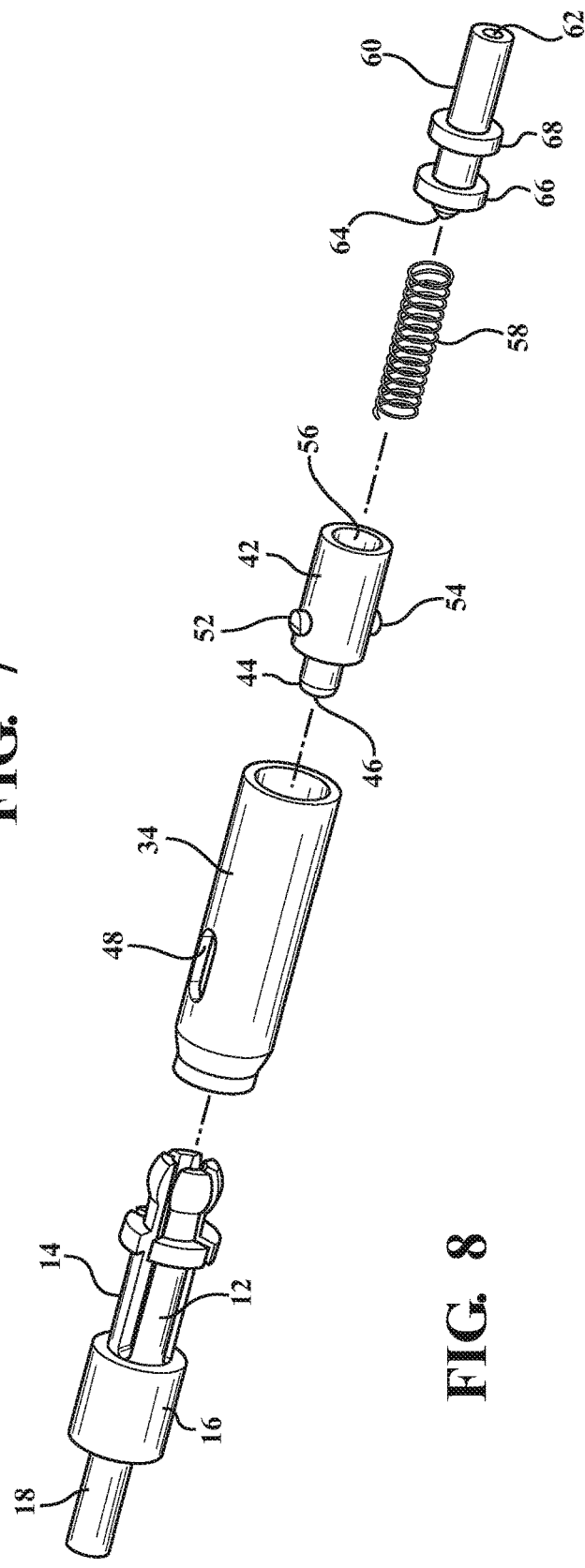
FIG. 7
FIG. 8

QUICK CONNECTOR WITH SPHERICAL INTERFACE

CROSS REFERENCE TO RELATED APPLICATIONS

The present application claims the priority of U.S. Ser. No. 62/869,737 filed Jul. 2, 2019.

FIELD OF THE INVENTION

The present invention discloses a quick connector with male and female terminals exhibiting opposing spherical interface profiles which prevents unintended disassembly.

BACKGROUND OF THE INVENTION

Current technology in the area of quick connect assemblies includes the use of outwardly expanding collet arms (see for example Reasoner, U.S. Pat. No. 7,927,036) and which requires the associated housing holding the male to female connection to be larger to accommodate the expansion of the collet arms during the establishment of the connection.

Other references of note include the detachable linking system in Argillier, U.S. Pat. No. 9,222,501 which includes a similar male terminal configuration with a spherical OD (see FIG. 5) however which includes a different female housing configuration. Other prior art designs of note include the quick disconnect assembly of Nelson, U.S. Pat. No. 4,501,404, the anchor release of Allen, U.S. Pat. No. 4,733,625 (see in particular the connector eye and tubular receiver profile in FIG. 3) and the cable connector of Babb, U.S. Pat. No. 4,403,885 with a similar spherical male OD to female inner OD profile, albeit with numerous structural differences.

SUMMARY OF THE INVENTION

The proposed design discloses a quick connect assembly with each of male and female terminals. The male terminal includes a plurality of circumferential cross sectional spaced elongated and parallel extending beams, each extending from a common base over molded portion. Each of the beams conclude in a forward most arcuate portion which collectively defines a spherical outer diameter profile. A female housing includes a contoured and open forward inner diameter (ID) end for inwardly displacing/receiving the spherical OD of the male terminals.

A spring loaded plug is supported within the female receptacle is initially displaced rearwardly by the leading edges of the male beams and, upon the beams clearing the ID of the female terminal, the lever arms are subsequently caused to expand outwardly until the male connector spherical OD aligns with an inner mating spherical ID within the female housing. At this point, the inwardly compressed spring in the female housing pushes the plug forwardly until a projecting snout portion of the plug seats within a now expanded and open ID of the male profile, thereby preventing radial expansion or contraction of the male beams and, consequently, disconnection of the male to female spherical interface.

Additional features include one or more access slots configured axially along the female receptacle housing, within which seat radial projections of the plug. Opening of the terminal to permit servicing occurs upon retracting the plug along the slots until the forward snout unseats from between the forward ends of male beams, at which point the beams are allowed to compress toward each other to minimize the spherical OD dimension to the point which it can be axially retracted out of engagement with the forward ID of the female housing.

BRIEF DESCRIPTION OF THE DRAWINGS

Reference will now be made to the attached drawings, when read in combination with the following detailed description, wherein like reference numerals refer to like parts throughout the several views, and in which:

FIG. 1 is a plan view of the assembled quick connector with male and female side terminals;

FIG. 2 is a view of the detached male side terminal;

FIG. 3 is a corresponding view of the detached female side terminal;

FIG. 4 is a linear cutaway of FIG. 1 and illustrating the engagement profile established between the male and female terminals;

FIG. 5 is a linear cutaway of the male terminal of FIG. 2 and as shown in FIG. 4 and depicting the recessing of the inner facing sides of the male terminal beams for seating the forward snout projection of the spring loaded plug in the engaged position;

FIG. 6 is a likewise linear cutaway of the female terminal of FIG. 3 and as shown in FIG. 4 and depicting the configuration of the spring loaded plug and forward snout projection for capturing between the male terminal beams in order to prevent extracting displacement of the spherical OD of the male terminal ends from the seating female housing ID profile;

FIG. 7 is a substantial repeat of FIG. 4 and again depicting a linear cutaway of the male/female terminals with element callouts;

FIG. 8 is an exploded view of the quick connect of FIG. 1; and

DETAILED DESCRIPTION OF THE PREFERRED EMBODIMENTS

Figure 9:
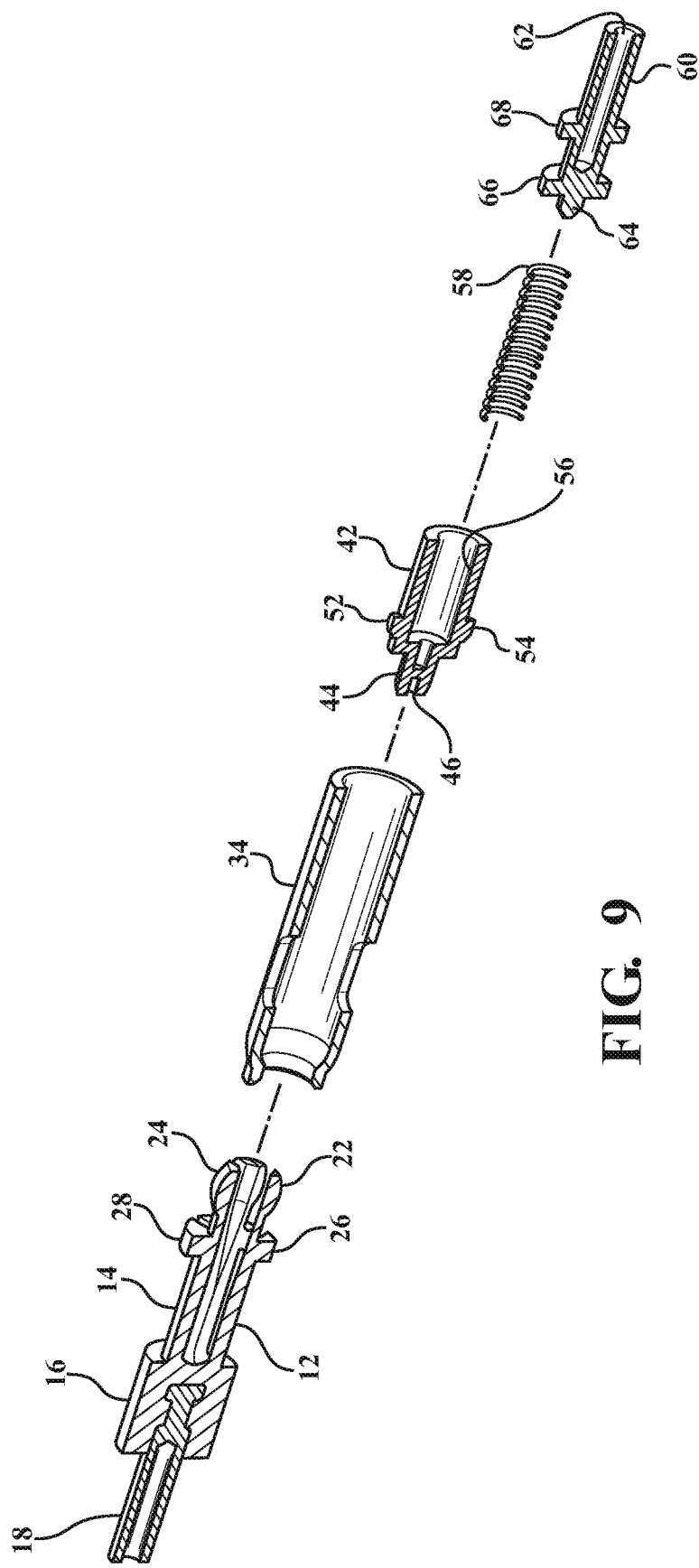
FIG. 9 is linear cutaway of FIG. 8.

With reference to the attached illustrations, the present invention discloses a quick connect assembly having an improved spherical engagement interface established between the male and female terminals in order to prevent unintended disconnection. As depicted in FIG. 1, a plan view is provided of the assembled quick connector, generally at 10, which includes a male terminal exhibiting a plurality of elongated and cross sectionally circumferential spaced linear and elongated extending beams, a pair of which are shown at 12 and 14 and are joined at a base end to a common over molded portion 16. The male terminal beams are understood to be constructed of any of a suitable spring steel or similar resilient construction which allows the beams to both inwardly collapse (compress) as well as to subsequently expand back to their initial and non-deflected shape. Other options can include utilizing an injection molded thermoplastic material which provides similar mechanical properties.

As depicted in the exploded perspective view of FIG. 8, one non-limiting variant of the present invention depicts a plurality of four circumferentially spaced and elongate extending beams, these collectively exhibiting sufficient spacing there between in order to provide for sufficient radial deflection of the beams and their contoured forward ends during each of engagement and detachment within the forward narrowed receiving profile of the female housing. As further shown in the linear cutaway views of FIGS. 4-5, a terminal shaft 18 engages, via a keyed end profile 20, with the male terminal over molded portion 16.

The forward extending portions of each of the beams (again depicted in FIGS. 2 and 4-7 by selected beams 12 and 14 of the male terminal in combination with the perspective and perspective linear cutaway views of FIGS. 8-9) each conclude in forward most arcuate profile, see at 22 and 24 for beams 12 and 14, respectively. The forward arcuate portions of the four beams as depicted in the non-limiting example of FIGS. 8-9 collectively define a pseudo-spherical outer diameter profile.

Without limitation, additional embodiments can include varying pluralities of circumferentially arrayed and linear extending beams not limited to any of two, three, five or more beams within the scope of the present invention. The beams each further include radial projecting stop projections, see at 26 and 28 for selected beams 12 and 14, which define a forward-most insertion profile of the forward most extending arcuate portion within the female housing (see again FIG. 1). As further best shown in FIGS. 4, 5 and 7, the inside forward edge profile of each beam includes a lengthened recess profile (see at 30 for selected beam 12 and at 32 for further selected beam 14), the purpose for which will be better described as follows for seating the forward most projecting snout associated with the forwardly displaced spring loaded plug contained within the female housing.

The female terminal includes a sleeve shaped and elongated housing, shown at 34 and which likewise can include a metal or other suitable construction consistent with the application of the terminal assembly to operate as a connecting interface between the male and female junction. The female housing 34 includes a contoured and open forward inner diameter (ID) end which, as will be further described, inwardly displaces the inserted spherical OD defining profile (see again arcuate surfaces 22 and 24) of the male elongated terminals 12/14. As further best shown in the cutaway view of FIGS. 4 and 6, the forward open edge of the female housing is further defined by an annular inward taper 36 which defines an entranceway for the inserting male terminal beams. The taper 36 converges at an inner (ID) diameter 38 (see FIG. 6), following which the female housing interior defines an arcuate outward extending recess 40 in communication with the ID 38 and which, as will be described, provides for seating of the arcuate end profiles 22/24 of the male beams in the engaged position.

A spring loaded plug 42 is supported within the female receptacle 34 and includes an annular and sleeve shaped body (see also FIG. 9) which is dimensioned to displace a given distance along the inside annular surface of the female housing 34. The plug 42 includes a forward projecting and reduced diameter snout portion 44 which concludes in a flat forward end face 46. Additional features include one or more access slots configured axially along the female receptacle housing (these defined by closed inner perimeter surfaces 48/50 configured axially along the female housing 34), within which seat aligning radial projections 52/54 of the plug 42.

The plug 42 further includes an annular and rearwardly open interior 56, which receive a forward end of a coil spring 58 supported within the female housing 34. A female receptacle closeout 60 is similar to the male terminal shaft 18 in shape. The female closeout 60 includes a rear drilled or otherwise configured hole or passageway 62, within which a wire (not shown) can be inserted prior to being crimped or otherwise secured. The closeout further can include a groove for receiving the female receptacle crimp to resist the compressive and tensile loads applied to the wire.

As further best shown in each of FIGS. 4, 6 and 7, the female closeout 60 includes a corresponding snout 64 which seats an opposite rearward facing end of the coil shaped compression spring 58 for keeping the spring centered. As further shown, the closeout 60 includes a pair of radial and linear spaced annular projections 66 and 68 which provide an annular groove for crimping and to anchor the closeout 60 to the inside surface of the female housing 34 for securing and closing the female assembly at a generally rearward most location so that the closeout passageway extends from the housing 34.

In operation, and upon initial displacement of the male connector or terminal relative to the female receptacle opening, the arcuate end projections, again represented at 22/24 for the plurality of male extending beams further indicated at 12/14, are caused to initially collapse inwardly as they slide inwardly relative to the annular flared entranceway rim 36 of the female housing and its succeeding and proximately located inner diameter ID 38. The forward most edges of the beam end projections concurrently displace the spring loaded plug 42 in a counter-biased and compressing rearward direction toward the rear end affixed female closeout 60.

Upon the male terminal beams clearing the ID 38 of the female terminal, the lever arms are subsequently caused to expand outwardly until the male connector spherical OD defining arcuate surfaces 22/24 align with the arcuate outward extending recess 40 within the female housing. At this point, the separate distance between the male beams is such that the inwardly compressed spring 58 is able push the plug 42 forwardly until its projecting snout portion 42 seats in the opened spaced defined between the now expanded and open lengthened recess profiles 30/32 established between the circumferentially arrayed beams ID of the male beams. Accordingly, and by sandwiching the arcuate end profiles 22/24 of the male terminal beams between the arcuate surface 40 of the female housing interior and the forwardly displaced plug snout 44, radial expansion or contraction of the male beams is prevented and, consequently, incidences of unintended disconnection of the male to female spherical interface are avoided.

Once disconnection of the male to female terminal interface is desired, the radial plug projections 52/54 are rearwardly and manually displaced within and along the access slots 48/50 configured axially along the female receptacle housing. At this point, opening of the terminal (i.e. disengagement of the male to female interface) to permit servicing occurs upon retracting the plug 42 along the slots until the forward snout 44 unseats from between the forward ends of male beams, at which point the beams are allowed to compress toward each other to minimize its spherical OD dimension to the point which it can be axially retracted out of engagement with the forward ID 38 of the female housing 34.

Having described my invention, other and additional preferred embodiments will become apparent to those skilled in the art to which it pertains, and without deviating from the scope of the appended claims. The detailed description and drawings are further understood to be supportive of the disclosure, the scope of which being defined by the claims. While some of the best modes and other embodiments for carrying out the claimed teachings have been described in detail, various alternative designs and embodiments exist for practicing the disclosure defined in the appended claims.

The invention claimed is:

1. A quick connect assembly, comprising:
a male terminal having a plurality of circumferentially arrayed and elongated beams defining a separation distance therebetween, each of said beams including forward-most arcuate projecting and outer diameter defining portions;
a female terminal having a housing exhibiting an inner diameter inlet location communicating with an interior arcuate and expanded extending recess which matches a profile collectively defined by said outer diameter defining beam portions;
a coil spring forwardly biasing a plug displaceably supported within said female terminal housing, said plug including a forward most projecting snout portion;
upon initial displacement of said male terminal toward said female terminal, said beams being caused to initially collapse inwardly as they slide inwardly relative to said inner diameter inlet location, forward most edges of said beams concurrently displacing said plug in a counter-biased and compressing rearward direction against said coil spring toward a rear of said female terminal; and
upon said elongated beams clearing the inner diameter inlet location of said female terminal, said beams subsequently being caused to expand outwardly until said forward-most arcuate projecting and outer diameter defining portions align with and seat within the female expanded extending recess, resulting in the separation distance between said male beams allowing said compressed spring to forwardly displace said plug until said projecting snout portion seats between said male beams, preventing unintended collapse and removal of said male beams from within said female terminal housing.

2. The invention as described in claim 1, said plug further comprising radial projections which seat within elongate and axial extending slots formed in said female terminal housing, manual and rearward displacement of said plug via said projections along said slots facilitating retraction of said snout from between said beams and subsequent collapsing of said beams during retraction through said female housing inner diameter inlet location.

3. The invention as described in claim 1, said arcuate projecting portions of said male beams and said female arcuate expanded recess each further comprising mating spherical shaped profiles.

4. The invention as described in claim 1, said male terminal further comprising an over molded component supporting said elongated beams.

5. The invention as described in claim 4, further comprising a terminal shaft secured to said over molded component, said terminal shaft adapted to receiving a first wire.

6. The invention as described in claim 5, further comprising a female closeout secured to said female terminal housing and adapted to receive a second wire.

7. The invention as described in claim 6, said female closeout further comprising a second snout projecting in a forward direction for seating and centering an opposite rearward end of said compressed coil spring.

8. The invention as described in claim 7, said female closeout further comprising a pair of radial and linear spaced annular projections which anchor said closeout to said female housing at a generally rearward most location so that a closeout passageway extends from said female housing.

9. The invention as described in claim 6, said male terminal beams each further comprising radial stop projections which define a forward-most insertion profile of said forward most extending arcuate portions within said female housing.

10. A quick connect assembly, comprising:
a male terminal having a plurality of circumferentially arrayed and elongated beams defining a separation distance therebetween, each of said beams including forward-most arcuate projecting and outer diameter defining portions;
a female terminal having a housing exhibiting an inner diameter inlet location communicating with an interior arcuate and expanded extending recess which matches a profile collectively defined by said outer diameter defining beam portions;
a coil spring forwardly biasing a plug displaceably supported within said female terminal housing, said plug including a forward most projecting snout portion;
said plug further exhibiting radial projections which seat within elongate and axial extending slots formed in said female terminal housing, manual and rearward displacement of said plug via said projections along said slots facilitating retraction of said snout from between said beams and subsequent collapsing of said beams during retraction through said female housing inner diameter inlet location;
upon initial displacement of said male terminal toward said female terminal, said beams being caused to initially collapse inwardly as they slide inwardly relative to said inner diameter inlet location, forward most edges of said beams concurrently displacing said plug in a counter-biased and compressing rearward direction against said coil spring toward a rear of said female terminal; and
upon said elongated beams clearing the inner diameter inlet location of said female terminal, said beams subsequently being caused to expand outwardly until said forward-most arcuate projecting and outer diameter defining portions align with and seat within the female expanded and extending recess, resulting in the separation distance between said male beams allowing said compressed spring to forwardly displace said plug until said projecting snout portion seats between said male beams, preventing unintended collapse and removal of said male beams from within said female terminal housing.

11. The invention as described in claim 10, said arcuate portions of said male beams and said female arcuate expanded recess each further comprising mating spherical shaped profiles.

12. The invention as described in claim 10, said male terminal further comprising an over molded component supporting said elongated beams.

13. The invention as described in claim 12, further comprising a terminal shaft secured to said over molded component, said terminal shaft adapted to receiving a first wire.

14. The invention as described in claim 13, further comprising a female closeout secured to said female terminal housing and adapted to receive a second wire.

15. The invention as described in claim 14, said female closeout further comprising a second snout projecting in a forward direction for seating and centering an opposite rearward end of said compressed coil spring.

16. The invention as described in claim 15, said female closeout further comprising a pair of radial and linear spaced annular projections which anchor said closeout to said female housing at a generally rearward most location so that a closeout passageway extends from said female housing.

17. The invention as described in claim 14, said male terminal beams each further comprising radial stop projections which define a forward-most insertion profile of said forward most extending arcuate portions within said female housing.

18. A quick connect assembly, comprising:
- a male terminal having a plurality of circumferentially arrayed and elongated beams defining a separation distance therebetween, each of said beams including forward-most arcuate projecting and outer diameter defining portions;
- a female terminal having a housing exhibiting an inner diameter inlet location communicating with an interior arcuate and expanded extending recess which matches a profile collectively defined by said outer diameter defining beam portions;
- said arcuate extending portions of said male beams and said female arcuate recess each further including mating spherical shaped profiles;
- a coil spring forwardly biasing a plug displaceably supported within said female terminal housing, said plug including a forward most projecting snout portion;
- upon initial displacement of said male terminal toward said female terminal, said beams being caused to initially collapse inwardly as they slide inwardly relative to said inner diameter inlet location, forward most edges of said beams concurrently displacing said plug in a counter-biased and compressing rearward direction against said coil spring toward a rear of said female terminal; and
- upon said elongated beams clearing the inner diameter inlet location of said female terminal, said beams subsequently being caused to expand outwardly until said forward-most arcuate projecting and outer diameter defining portions align with and seat within the female expanded extending recess, resulting in the separation distance between said male beams allowing said compressed spring to forwardly displace said plug until its projecting snout portion seats between said male beams, preventing unintended collapse and removal of said male beams from within said female terminal housing.

19. The invention as described in claim 18, said plug further comprising radial projections which seat within elongate and axial extending slots formed in said female terminal housing, manual and rearward displacement of said plug via said projections along said slots facilitating retraction of said snout from between said beams and subsequent collapsing of said beams during retraction through said female housing inner diameter inlet location.

20. The invention as described in claim 18, said male terminal further comprising an over molded component supporting said elongated beams, a terminal shaft secured to said over molded component, said terminal shaft adapted to receiving a first wire, a female closeout secured to said female terminal housing and adapted to receive a second wire.

* * * * *